United States Patent [19]

Negus

[11] Patent Number: 4,998,254
[45] Date of Patent: Mar. 5, 1991

[54] STABILIZED SYNCHRONOUSLY PUMPED DYE LASER

[75] Inventor: Daniel K. Negus, La Honda, Calif.
[73] Assignee: Coherent, Inc., Palo Alto, Calif.
[21] Appl. No.: 381,969
[22] Filed: Jul. 18, 1989
[51] Int. Cl.$^5$ ............................................. H01S 3/098
[52] U.S. Cl. ........................................ 372/18; 372/29; 372/97; 372/13
[58] Field of Search ....................... 372/29, 32, 13, 18, 372/97

[56] References Cited

U.S. PATENT DOCUMENTS

| | | | |
|---|---|---|---|
| 3,437,955 | 4/1969 | Enloe et al. | 372/32 |
| 3,471,803 | 10/1969 | Forster | 372/32 |
| 3,534,288 | 10/1970 | Forster | 372/32 |
| 4,590,597 | 5/1986 | Long-Sheng et al. | 372/32 |
| 4,592,058 | 5/1986 | Mongeon et al. | 372/32 |
| 4,665,524 | 5/1987 | Cotter | 372/13 |
| 4,666,295 | 5/1987 | Duvall, III et al. | 372/32 |
| 4,730,105 | 3/1988 | Mitschke et al. | 372/31 |
| 4,815,085 | 3/1989 | Javan | 372/32 |
| 4,817,100 | 3/1989 | Cameron | 372/32 |
| 4,856,010 | 8/1989 | Wissman et al. | 372/32 |

Primary Examiner—Léon Scott, Jr.
Attorney, Agent, or Firm—Limbach, Limbach & Sutton

[57] ABSTRACT

A length stabilized, dispersion compensated synchronously pumped mode locked dye laser is disclosed. The output of the dye laser is actively stabilized by monitoring the output power thereof and generating an error signal for actively adjusting the cavity length. The operation is enhanced by actively controlling the power of the pump pulses exciting the dye laser so that the power fluctuations in the dye laser are due primarily to fluctuations in cavity length. Stability is also enhanced by operating the cavity with a negative group velocity disperison. The resultant lengthening of the output pulses is compensated by a pulse compressor, located outside of the cavity, which adds a positive group velocity disperison to upchirp and shorten the pulses.

9 Claims, 3 Drawing Sheets

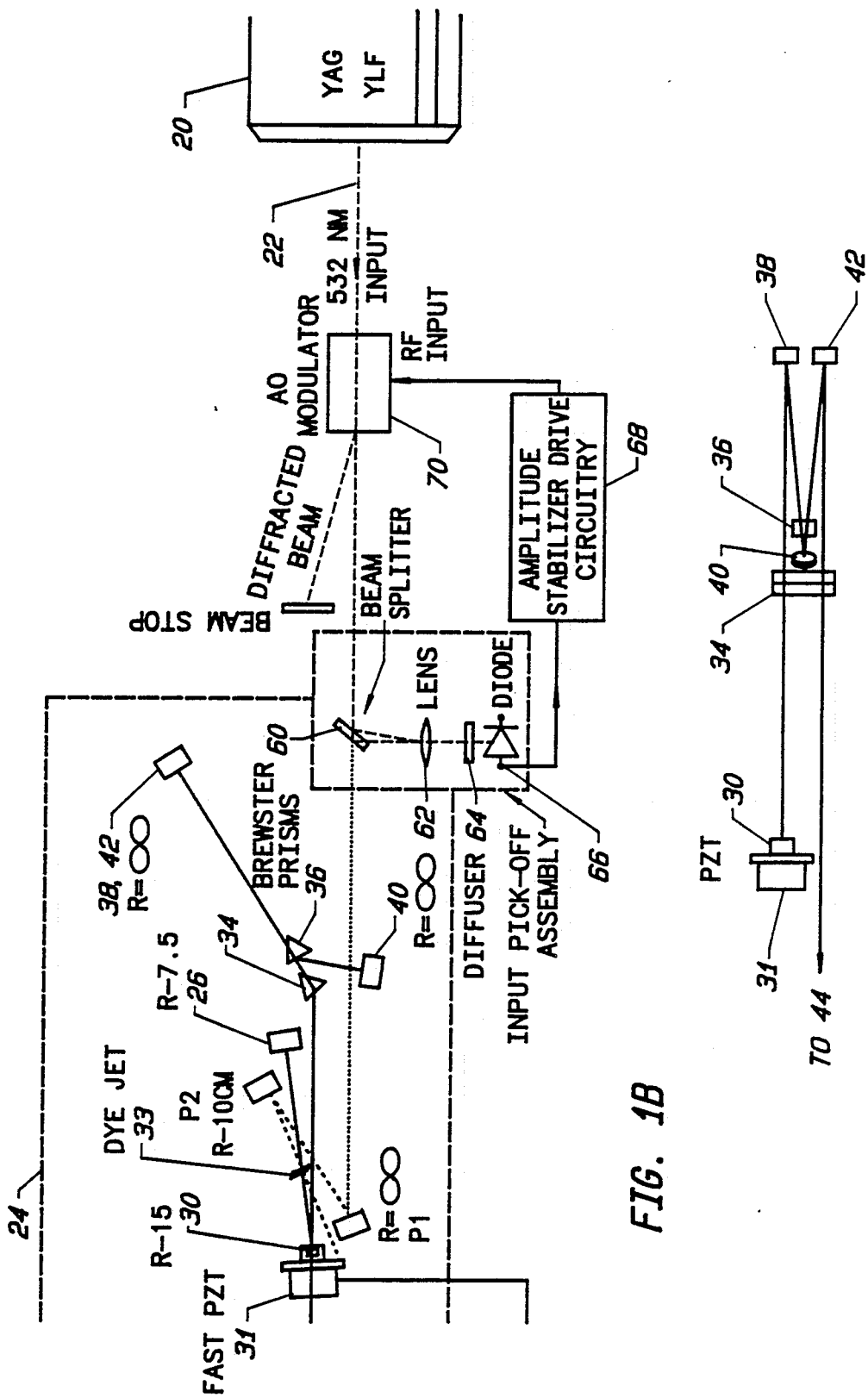

STABILIZED SYNCHRONOUSLY PUMPED DYE LASER

TECHNICAL FIELD

The subject invention relates to a length stabilized, dispersion compensated, synchronously pumped dye laser.

BACKGROUND OF THE INVENTION

In the prior art, many efforts have been made to improve the stability of short pulse (ie. 100–300 femptosecond range) dye lasers in order to maximize the uniformity of the length, width and power of the output pulses. These efforts have included active stabilization of the length of the resonant cavity. For example, in U.S. Pat. No. 4,815,080 to Chesnoy, a system is disclosed wherein the length of the cavity is actively adjusted based on a measurement of the output wavelength of the laser. More particularly, the output wavelength is detected and an error signal is generated which is used in a feedback loop to control the length of the cavity.

There are many practical problems with the approach described in Chesnoy. For example, this approach does not work well beyond the central tuning frequency of the dye laser. The approach disclosed in Chesnoy is also cavity specific and may not be readily extended to other laser cavities which have different group velocity dispersion.

Another approach for stabilizing a pumped dye laser is disclosed in U.S. Pat. No. 4,314,211, issued Feb. 2, 1982 to Mollenauer. In this device, an error signal is generated by comparing the timing of the output pulses to a reference oscillator. Unfortunately, this approach requires that the length of the cavity of the pump laser must be very stable which is difficult to achieve.

In U.S. Pat. No. 4,727,553, to Fork, an approach is utilized which attempts to balance a number of components within the cavity to minimize the length of the output pulse. In this approach, the group velocity dispersion, self-phase modulation, saturable gain and saturable absorption are all balanced. This approach was used in a colliding pulse mode-locking laser which is pumped by a continuous wave source. This type of laser does not require a length stabilized resonator and therefore, this approach cannot be used alone to obtain short pulses with a synchronously pumped hybridly mode locked linear laser.

Accordingly, it is an object of the subject invention to provide a new and improved ultra fast, stabilized dye laser.

It is another object of the subject invention to provide a laser system with improved stability.

SUMMARY OF THE INVENTION

In accordance with this and many other objects, the subject invention includes a laser with a length stabilized cavity. Length stabilization is achieved by detecting the amplitude of the output beam and generating a feedback signal for controlling the length of the cavity.

In the preferred embodiment, the laser is a synchronously pumped dye laser. In this embodiment, the input power of the pump laser is also controlled. More specifically, the power of the pump laser is detected just before it enters the dye cavity and a control signal is generated which is supplied to a modulator through which the beam is passed. The modulator functions to stabilize the pump power delivered to the dye laser.

In another aspect of the subject invention, the laser is operated with a negative group velocity dispersion in order to improve the stability of the output pulses. Operation with a negative group velocity dispersion will generate pulses that are longer than if the laser resonator was optimally balanced for group velocity dispersion. These longer output pulses are then compressed outside of the cavity using a pulse compressor to create pulses having a length equivalent to the length that would have been generated if the group velocity dispersion had been balanced within the cavity. By this arrangement, very short pulses are generated and highly stable operation is achieved.

BRIEF DESCRIPTION OF THE DRAWINGS

FIG. 2 is a top view of a portion of the laser system of the subject invention illustrating the internal prism arrangement used to vary the group velocity dispersion within the cavity.

DETAILED DESCRIPTION OF THE PREFERRED EMBODIMENT

Figure 1A:
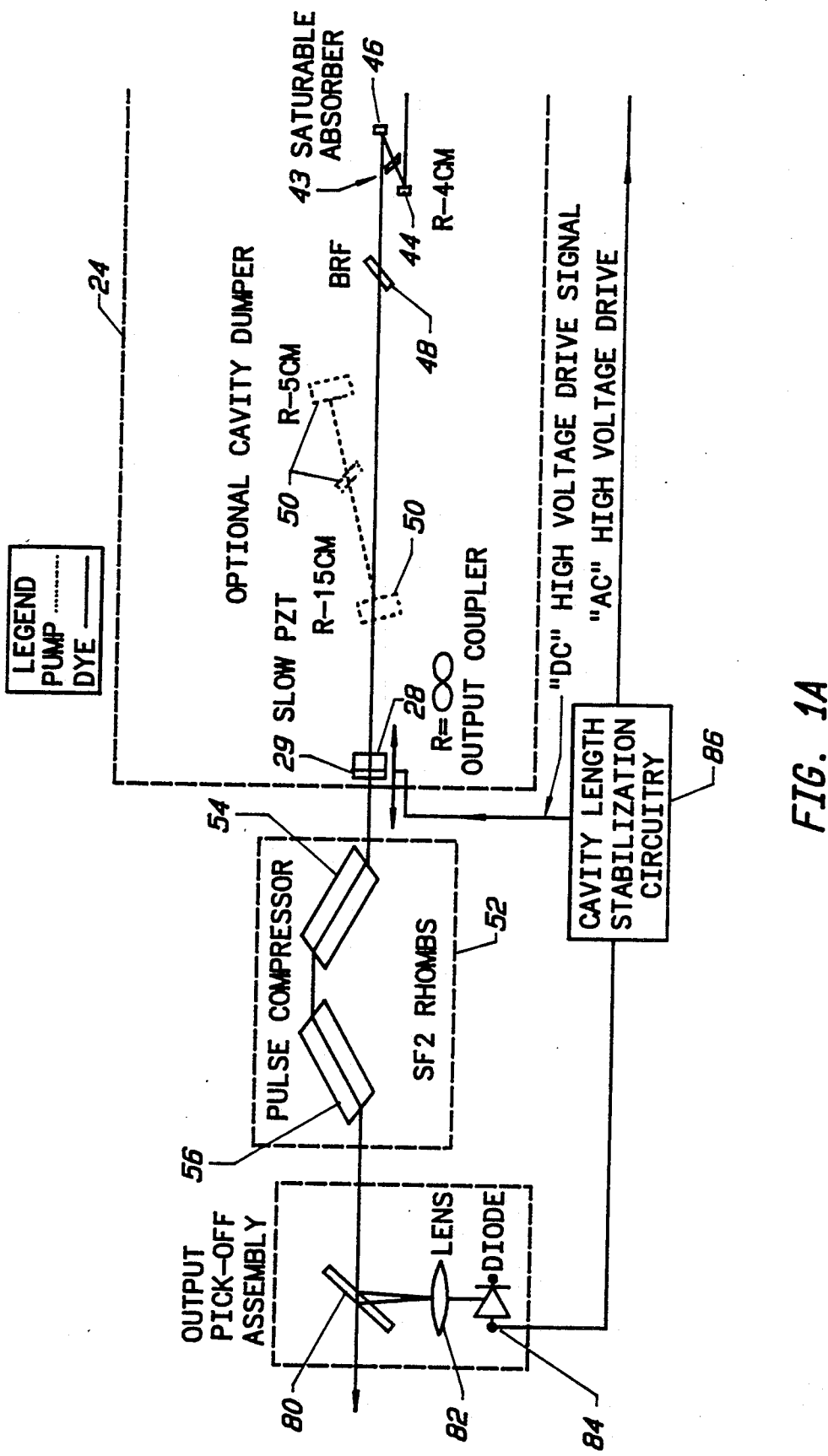
FIG. 1 is a schematic layout of a laser system formed in accordance with the subject.

Referring to FIGS. 1 and 2, the laser system of the subject invention includes a pump laser 20 defined by a frequency doubled neodymium YAG or YLF laser. The output beam 22 is used to pump a synchronously pumped, mode locked dye laser shown generally as 24. The dye laser 24 has a linear cavity defined by a first end mirror 26 and a second end mirror 28. The second end mirror 28 defines the output coupler. In the preferred embodiment, end mirror 28 is mounted on a slow PZT crystal 29 so its position can be adjusted and the cavity length varied as discussed below.

Between the end mirrors are a number of other optical elements defining the cavity. For example, a mirror 30 is provided which is mounted on a fast PZT 31 for adjusting the length of the cavity. Mirrors 26 and 30 are curved in a manner to form a waist at the gain dye jet 33.

A pair of prisms 34 and 36 are included for adjusting the group velocity dispersion within the cavity. The use of prisms for adjusting group velocity dispersion is disclosed in the patent to Fork, cited above. In the arrangement described in Fork, four prisms are used. In the subject invention, the beam passes through each of the two prisms 34, 36 twice to achieve a similar result.

As best seen in FIG. 2, the beam first passes through prism 34 and is then reflected by mirror 38 and into prism 36. After passing out of prism 36 the beam is reflected by mirror 40 back through prism 36. After passing through prism 36, it is reflected by mirror 42 and passes back through prism 34. As described in Fork, by adjusting the relative position of the prisms 34 and 36, the amount of glass through which the beam passes is changed thereby varying the group velocity dispersion within the cavity.

After the beam passes out of the prisms, it is directed to the saturable absorber dye jet 43. The saturable absorber dye jet 43 is defined by two curved mirrors 44 and 46 which form a waist at the saturable absorber. The use of a saturable absorber to shape pulses in a dye laser is well known in the prior art.

The beam is then passed through a birefringent tuning element 48 for tuning the wavelength of the laser. The use of a birefringent tuning element is described in U.S. Pat. No. 3,868,592, issued Feb. 25, 1975. After the beam passes through the birefringent tuning element it reaches the output coupler 28. In the preferred embodiment, an additional cavity dumper 50 can be used to extract higher energy pulses.

In the first aspect of the subject invention, the group velocity dispersion within the cavity is adjusted to enhance the stability of the laser output. As noted above, it is known to optimize the group velocity dispersion to obtain the shortest steady state pulses circulating in the cavity. However, it has been recognized that as the group velocity dispersion is optimized for the shortest pulses inside the resonator, the stability of the laser is reduced. In accordance with the subject invention, this problem is avoided by intentionally operating the laser with a negative group velocity dispersion in order to better stabilize the laser output. By negative group velocity dispersion it is meant that there is less group velocity dispersion in the cavity than is necessary to obtain the shortest possible pulses for a given resonator such that the output pulses are lengthened. However, these lengthened pulses are not transform limited and have excess bandwidth and a nearly linear frequency sweep or downchirp. A pulse with these type of characteristics can be narrowed outside of the resonant cavity to make up for the lengthening within the cavity due to the presence of the negative group velocity dispersion.

As seen in FIG. 1, a means 52 is provided for compressing the pulses outside of the cavity. In the preferred embodiment, the pulse compressor 52 is defined by a pair of Brewster rhombs 54 and 56 formed from SF2 and having a total optical path length of 1.0 inches. The rhombs introduce a fixed amount of positive group velocity dispersion to the output pulses to compensate for the negative group velocity dispersion found in the cavity. The addition of the positive group velocity dispersion functions to shorten the pulses by upchirping the pulses that had been downchirped within the cavity by the negative group velocity dispersion. The resulting pulses will have improved stability and a pulse width similar to the pulses that would have been generated from a cavity where the group velocity dispersion had been optimized.

In the preferred embodiment, the two rhombs 54 and 56 are oriented in a manner so that the polarized output beam from laser 24 enters and exits all of the faces at Brewster's angle to minimize transmission losses. In this manner the need for expensive antireflection coatings, which have a limited wavelength range, is eliminated. In addition, the two rhombs are oriented with respect to each other so that the path of the beam after passing through the rhombs is coincident with the input beam so that the pulse compressor 50 can be inserted or removed from the beam path without deviating the beam from its initial path.

The pulse compressor 52 is a fixed element introducing a fixed positive group velocity dispersion. With the pulse compressor in place, the laser operation is optimize by adjusting the position of the prisms 34 and 36 until the pulse width is minimized. Operation in this manner results in the cavity having a negative group velocity dispersion. By having a negative group velocity dispersion, the stability is increased by decreasing the sensitivity to perturbative forces such as amplitude fluctuations of the pump beam, pointing fluctuations of the pump beam resulting in a modulation of the overlap between the pump and resonator beams, cavity length fluctuations of the optical resonator caused by mechanical vibration, jet pressure change, thermal expansion, variations of the index of refraction of air as a function of temperature, pressure humidity and variations of the pulse pump rate.

In another aspect of the subject invention, the stability of the system is further enhanced by actively stabilizing the length of the cavity based on a measurement of the output power of the laser. As discussed above, there are a number of drawbacks associated with the prior art approaches proposed for actively stabilizing the length of the cavity. The subject technique provides a practical approach that overcomes many of these drawbacks.

The subject technique relies on the fact that the output power of the laser can be correlated directly with cavity length in certain lasers. Output power is also affected by many other parameters. If these parameters are controlled, stabilization based on a measurement of output power can be achieved. Most of these parameters can be controlled by using good mechanical theory in designing the laser cavity. For example, kinematic supports and damping techniques can be used to isolate the resonator from outside perturbations.

The other significant parameter which effects output power in the illustrated laser system is the input power of the pump beam. Unless the pumping power is accurately controlled, the fluctuations of the output power of the dye laser pulses can not be correlated to the cavity length. Accordingly, the stabilization of the subject system includes active stabilization of both the dye laser cavity length as well as the stabilization of the pump beam input power.

In the preferred embodiment, the stabilization of the pump beam input power is achieved by detecting the power just prior to its entry into the dye laser cavity. As seen in FIG. 1, a beam splitter 60 is used to pick off a small portion of the pump beam radiation. The reflected portion of the beam is focused by lens 62 through diffuser 64 and onto temperature stabilized photodiode 66. Photodiode 66 generates an output voltage that is proportional to the light energy striking the surface. This voltage is gated to amplitude stabilization drive circuitry 68. Drive circuitry 68 is a programmed microprocessor control which includes a voltage amplifier, voltage reference signal and integrator and functions to generate an error signal for use in a feedback loop to control the power of the pump beam reaching the dye jet.

In the illustrated embodiment, the pump beam is passed through an acousto-optic modulator 70. The transmission characteristics of the modulator are controlled by an RF drive circuit. The output of the stabilization circuit 68 is an error signal used to control the RF drive circuit which, in turn, varies the transmission of the beam through the AO modulator 70 in a feedback loop. In this manner, the power of the pump beam reaching the dye jet can be actively stabilized.

Once the resonator has been isolated from outside perturbations and the input power of the pump beam has been stabilized, fluctuations of the dye laser output power will be dominated by cavity length fluctuations. Accordingly, the cavity length can be stabilized by monitoring the dye laser output power and varying the cavity length in response thereto. As seen in FIG. 1, a portion of the output beam of the dye laser is picked off by a beam splitter 80. The reflected portion of the beam is focused by lens 82 onto a temperature stabilized photodiode 84 which generates a voltage proportional to the light energy hitting its surface.

The voltage generated by the photodiode 84 is supplied to cavity length stabilization circuitry 86. Like stabilization circuitry 68, circuitry 86 includes amplification, reference and integration components. The output of this circuit is an error signal used to control the length of the cavity.

There are many methods for varying the length of the cavity. In the preferred embodiment, one or more of the cavity mirrors are mounted on PZT crystals which are responsive to the output of circuitry 86. As noted above, mirror 30 is connected to a PZT 31 which is capable of translating the mirror position in response to a signal from circuitry 86. In the preferred embodiment, PZT 31 is capable of very fast, but relatively small movements. A suitable PZT is available from NEC under model number AE0203D04. This PZT is used to make small but rapid changes in the length of the cavity.

Output coupler mirror 28 is also connected to a PZT 29 which is capable of larger, but relatively slower motion as compared to PZT 31. A suitable PZT is available from NEC under model number AE0505D16. By appropriate filtering in circuitry 86, the fast and slow excursions of output power can be isolated and the proper error signals can be supplied to the appropriate PZT.

Figure 3:
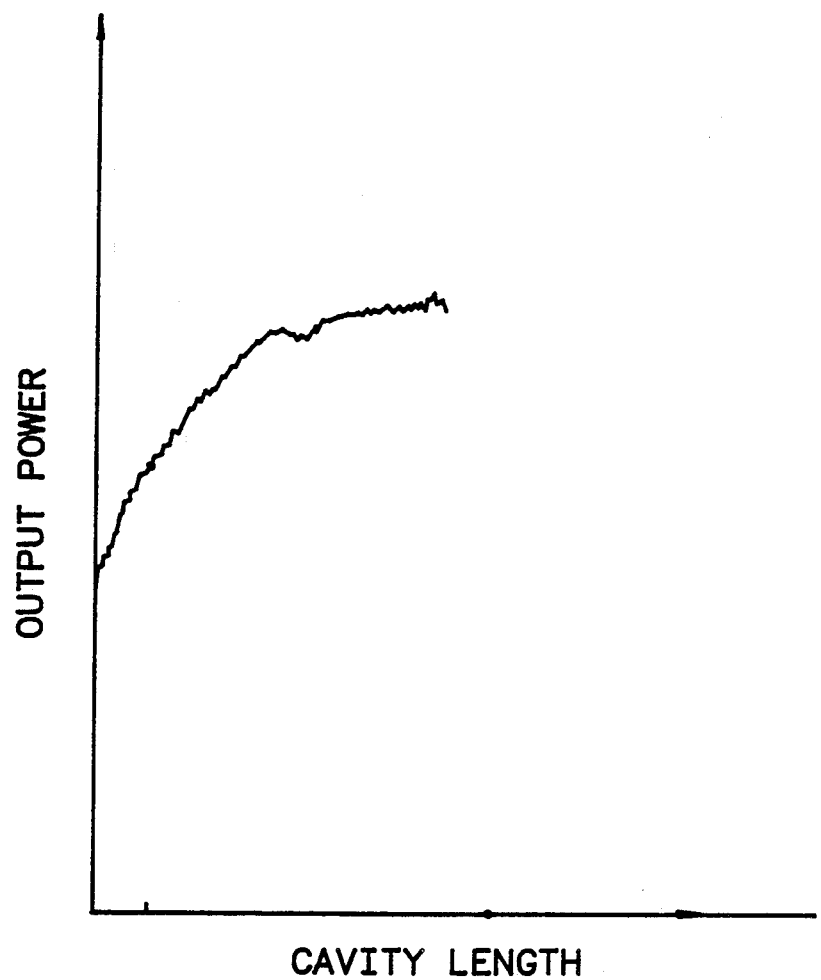
FIG. 3 is a graph illustrating the dependence between output power and cavity length.

FIG. 3 is a graph plotting the output power of the laser versus length of the dye cavity (which is inversely proportional to the signal supplied to the PZTs). As can be seen, as the drive voltage to the PZT is decreased and the cavity length is increased, the intensity of the output is increased. This direct dependence permits cavity length stabilization by measurement of the output power of the laser within the general region of optimal pulse performance. As noted above, this direct dependence is achieved by proper kinematic and damping design as well as by stabilizing the input pumping power. A laser system designed in accordance with the embodiment shown in the Figures can produce highly stable output pulses in the 100–300 femtosecond range with an average power of 250 milliwatts at a rate of 76 megahertz.

While the subject invention has been described with reference to a preferred embodiment, various other changes and modifications could be made therein by one skilled in the art without varying from the scope or spirit of the subject invention as defined by the appended claims. For example, the concept of length stabilization based on measurement of output power need not be limited to a laser pumped by another laser as long as the laser is arranged so that power fluctuations are predominantly the result of changes in the length of the cavity.

I claim:

1. An actively stabilized mode locked laser system comprising:
   a first laser generating a pulsed pump beam having a power;
   a second laser having a resonant cavity and a gain medium located in said resonant cavity, said gain medium being excited by the pulsed pump beam and generating a pulsed output beam;
   means for controlling the power of the pump pulses delivered to the second laser; and
   means for stabilizing the length of the resonant cavity of the second laser based on fluctuations in the power of the pulsed output beam therefrom.

2. A laser as recited in claim 1 wherein the means for stabilizing the cavity length of the second laser includes a means for measuring the power of the pulsed output beam of the second laser and generating an error signal based on detected variations and using the error signal to effect changes in the length of the cavity of the second laser.

3. A laser as recited in claim 2 wherein the cavity of the second laser includes at least one mirror and further includes a means for varying the position of the mirror in response to said error signal to affect a change in the length of the cavity.

4. A laser as recited in claim 1 wherein said means for controlling the power of the pulsed pump beam delivered to the second laser includes a means for measuring the power thereof and generating an error signal based on the detected variations and using the error signal to vary the power of the pulsed pump beam reaching the second laser.

5. A laser as recited in claim 4 wherein the power of the pulsed pump beam is varied by passing the beam through an acousto-optic modulator operated in response to said error signal.

6. An actively stabilized laser system comprising:
   a laser having a resonant cavity and generating an output beam having a power; and
   means for stabilizing the length of the resonant cavity of the laser based on fluctuations in the power of the output beam thereof.

7. A laser as recited in claim 6 further including a means for insuring that changes in the power of the output beam are due to changes in the cavity length of the laser.

8. A method of stabilizing a mode locked laser having a resonant cavity, said mode locked laser generating an output beam having a power, said output beam consisting of a train of output pulses comprising the steps of:
   monitoring the power of the output beam from the mode locked laser; and
   altering the length of the resonant cavity of the laser to maintain the power of the output beam at a level which produce stable output pulses.

9. A method of stabilizing a mode locked laser having a resonant cavity, said mode locked laser generating an output beam having a power, said output beam consisting of a train of output pulses and wherein said mode locked laser is pumped by a beam from a pump laser, said pump beam from the pump laser having a power, comprising the steps of:
   actively controlling the power of the beam from the pump laser delivered to the mode locked laser;
   monitoring the power of the output beam from the mode locked laser; and
   altering the length of the resonant cavity of the mode locked laser to maintain the power of the output beam at a level which produces stable output pulses.

* * * * *